United States Patent
Bell

(10) Patent No.: US 6,219,047 B1
(45) Date of Patent: *Apr. 17, 2001

(54) TRAINING AGENT

(76) Inventor: John Bell, 1643 Calle Plumerias, Encinitas, CA (US) 92024

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,206

(22) Filed: Sep. 17, 1998

(51) Int. Cl.[7] ............................................. G06F 3/00
(52) U.S. Cl. ............................................. 345/336
(58) Field of Search .................... 345/336, 337, 345/348; 434/118

(56) References Cited

U.S. PATENT DOCUMENTS

| | | | |
|---|---|---|---|
| 4,648,062 | 3/1987 | Johnson et al. ................. | 364/900 |
| 4,941,829 | 7/1990 | Estes et al. ..................... | 434/118 |
| 4,970,678 | 11/1990 | Sladowski et al. ............. | 364/900 |
| 5,103,498 | 4/1992 | Lanier et al. ................... | 395/68 |
| 5,122,972 | 6/1992 | Richards et al. ............... | 395/157 |
| 5,155,806 | 10/1992 | Hoeber et al. .................. | 395/157 |
| 5,157,768 | 10/1992 | Hoeber et al. .................. | 395/157 |
| 5,179,654 | 1/1993 | Richards et al. ............... | 395/157 |
| 5,228,859 | 7/1993 | Rowe .............................. | 434/118 |
| 5,377,319 | 12/1994 | Kitahara et al. ................ | 395/161 |
| 5,434,963 | 7/1995 | Kuwamoto et al. ............ | 395/155 |
| 5,442,759 | 8/1995 | Chiang et al. .................. | 395/375 |
| 5,483,632 | 1/1996 | Kuwamoto et al. ............ | 395/156 |
| 5,493,658 | 2/1996 | Chiang et al. .................. | 395/375 |
| 5,535,323 | 7/1996 | Miller et al. .................... | 395/155 |
| 5,546,521 | * 8/1996 | Martinez ......................... | 345/338 |
| 5,581,684 | 12/1996 | Dudzik et al. .................. | 395/338 |
| 5,602,982 | * 2/1997 | Judd et al. ...................... | 345/326 |
| 5,710,898 | 1/1998 | Tozuka ............................ | 395/338 |
| 5,727,950 | * 3/1998 | Cook et al. ..................... | 434/350 |

* cited by examiner

Primary Examiner—Raymond J. Bayerl
Assistant Examiner—Sy D. Luu
(74) Attorney, Agent, or Firm—Fish & Richardson, P.C.

(57) ABSTRACT

The present invention features methods and apparatus for providing tutorial information for a computer program application through a training agent activated by a user of the application. The agent takes control of the application interface and performs actions, such as finding and displaying tutorial information, in response to application user interface commands. The relation between the user interface commands and the actions is stored in a database used by the agent.

17 Claims, 2 Drawing Sheets

TRAINING AGENT

BACKGROUND OF THE INVENTION

The present invention relates to computer programs providing tutorial aid, particularly in a personal computer environment.

Personal computer application programs generally include help files which form a part of the application program. Some programs, such as the Windows® 95 operating system, includes on a separate CD-ROM tutorial sessions intended to acquaint a user with the features of the program. In some cases, the tutorial sessions are accessed and executed separately, that is, there is no link between the application program and the tutorial session; in other cases, a user can operate the application under the direction and control of the tutorial.

Some applications provide on-line help in the form of an on-line help file, specifically tailored to the current application program. The user selects, or enters in a separate on-line help window, a topic for which he seeks help, and then receives information pertaining to the selected topic. Often, the help files include hypertext links allowing the user to navigate within the help file to obtain information on related topics. However, the help files are frequently inadequate to guide the user through a complex sequence of steps, and it can be difficult for the user to find the information he is looking for. Usually, to find help on an aspect of the user interface, the user has to navigate a table of contents or index. Each application uses a different organization for its help system, making it difficult to find help.

Some applications provide help using a built-in facility in Windows for Computer Based Training (CBT). However, this requires access to the host program's source code.

SUMMARY OF THE INVENTION

The present invention features methods and apparatus for providing tutorial information for a computer program application through a training agent activated by a user of the application. The agent takes control of the application interface and performs actions, such as finding and displaying tutorial information, in response to application user interface commands. The relation between the user interface commands and the actions is stored in a database used by the agent.

The present invention features methods and apparatus for providing tutorial information for a computer program application through a training agent activated by a user of the application. The agent takes control of the application interface and performs actions, such as finding and displaying tutorial information, in response to application user interface commands. The relation between the user interface commands and the actions is stored in a database used by the agent.

In general, in one aspect, the invention features a system for providing information to a user of a computer program application. The system has a training agent for finding and displaying tutorial information to a user of a computer program application, a database, and a means for activating the training agent. The training agent does not include any portion of the computer program application. A database provides a computer-readable description of an application user interface, sources of computer-readable tutorial information, and linking information associating elements of the application user interface with sources of computer-readable tutorial information. When the training agent is activated, it operates to redirect user-selected user interface commands from the application user interface to a presentation program. The presentation program operates to obtain data from the database and to present tutorial information to the user according to a user-selected user interface command, the computer-readable description of the application user interface, and linking information associating the user-selected command to a source of computer-readable tutorial information.

Implementations of the invention can include one or more of the following advantageous features. The tutorial information may have a video clip, and the video clip may include sound. The training agent may act without affecting the running of the application and without affecting the behavior of the application. The training agent may be operable to provide training for multiple applications simultaneously, and may access an Internet site for a source of computer-readable tutorial information.

In general, in another aspect, the invention is directed to a method of adding help functionality to a computer program application having a user interface without modifying the application. A training agent is provided to run on the same computer with the application. A database is provided describing the user interface of the application and defining help actions to be performed by the training agent. The training agent is operable to intercept user commands directed to the application and to perform the help actions in response to user commands intercepted by the training agent. Tutorial information is provided for the training agent to present to the user by performing the help actions.

In general, in another aspect, the invention features a method for providing tutorial information to a user of a computer program application having an application user interface. A database is provided having a computer-readable description of the application user interface and sources of computer-readable tutorial information. The database provides linking information between the application user interface and the tutorial information. A training agent operable to use the database is provided to find the tutorial information relating to the computer program application based on user input received from the application user interface. The training agent is activated in response to a user-selected activation command. When the training agent is activated, it redirects application user interface commands so as to invoke the tutorial information via the application user interface for presentation to the user.

Implementations of the invention can include one or more of the following advantageous features . The training agent may be activated for more than one computer program application. The activation command may be generated by pressing a predetermined hotkey. The tutorial information may comprise video, audio or text information. Operable hooks may be installed to take control of a computer program application in response to input commands such as mouse commands, keyboard commands and messages.

In general, in another aspect, the invention features a computer program product stored on a tangible medium for adding tutorial help functionality to a computer program application. The computer product is a training agent having instructions operable on a computer to find tutorial information relating to a computer program application based on user input intercepted from a user interface of an application, and to cause the tutorial information to be presented to a user.

Implementations of the invention can include one or more of the following advantageous features. A database may have a computer-readable description of the user interface of the application and sources of computer-readable tutorial information. The database may provide linking information between the application user interface and the tutorial information.

In general, in another aspect, the invention features a method for providing tutorial information on demand to a user of a computer program application. In the method, a hotkey input is received. The hotkey input is followed by an application control input from a user running a computer program application on a computer. Thereupon tutorial information is provided to the user.

Advantages that may be seen in implementations of the invention include one or more of the following. The invention provides a powerful, flexible, and intuitive mechanism for providing tutorial information to a user of a computer program. The invention can be implemented without affecting, or requiring any reprogramming of, the computer program. The invention can easily be configured to provide tutorial information in any format, including any text, sound, video, or multimedia format for which a player application exists. The invention provides a user of an application with training on demand: when a user has a problem or question in using a function of an application, the user can simply press a hotkey and then direct a command to the application's user interface that would invoke the function; in response, the training agent can play and display any information available locally or remotely to assist the user. The agent provides a simple, intuitive, and consistent way of retrieving help on something related to the user interface. It is good for beginners who want to know "what does this do?"

The tutorial content can be updated without shipping new data to the user. For example, an application may behave differently in Windows NT 4.0 and Windows NT 5.0. If the tutorial is shipped before NT 5.0 is available, an Internet site can include information about NT 5.0-specific behavior once it is available. Different tutorials can be prepared for users with different levels of experience. A beginner may want to see a video describing the general purpose of a window, whereas an expert would prefer a textual explanation of the technical details. Through the agent, the user can tailor the level of detail presented by the tutorial.

The details of one or more embodiments of the invention are set forth in the accompanying drawings and the description below. Other features and advantages of the invention will become apparent from the description, the drawings, and the claims.

DETAILED DESCRIPTION

Figure 1:
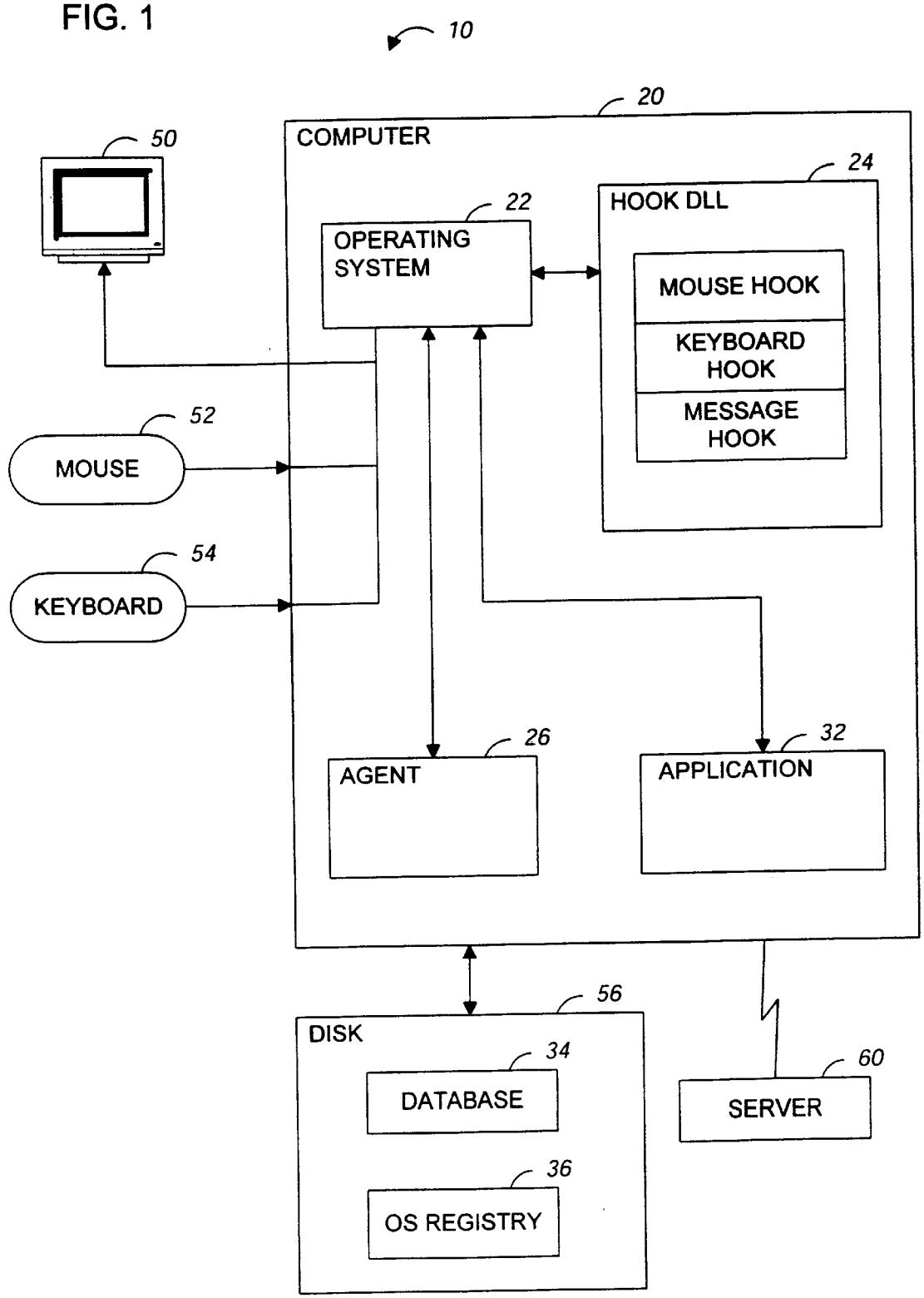
FIG. 1 is an schematic block diagram of a computer-based system with a training agent in accordance with the invention.

As shown in FIG. 1, a computer system 10 includes a training agent 26 in accordance with the invention. The particular implementation of the computer system and training agent that will be described is based on a personal computer running the Windows® 95 operating system 22. However, the methods and apparatus of the invention are suitable for other computers and operating systems, and in particular for other computers providing event-based graphical user interfaces.

The computer system 10 includes a programmable computer 20 connected to conventional input and output devices such as a display device 50, a printer, a pointing device such as a mouse 52, a keyboard 54, disk storage devices 56, and so on. The system 10 can include a server 60 connected by a network connection, local or remote, public or private, including an Internet connection to a server maintained by a vendor or publisher of an application to provide support and training information to users of the application.

The system 10 is used to run computer programs, especially application programs (applications). A user interacts with an application through a graphical user interface. Manipulations by the user of the user input devices, such as the keyboard and mouse, become commands that are sent to the application. An application user interface associates user commands with actions to be performed by an application 32. The training agent 26 provides, in response to user actions, tutorial information with respect to a selected application. The selected application will be referred to as the host application, or simply as the host, to distinguish it from the training agent, which is also an application.

The settings of agent 26 are stored in the Windows registry 36. The settings identify a hotkey, which is a preselected keyboard key or key combination, that can be used to invoke the agent. The settings also identify the location of a database of files 34, each of which corresponds to a potential host application and contains a computer-readable description of the application user interface of the host and the location or locations of computer-readable tutorial information relating to the host. The tutorial information can be stored on removable media such as DVD, CD-ROM, or magnetic disks, fixed disks, or on local or remote server resources identified by resource identifiers such as URIs (Uniform Resource Identifiers) including URLs (Uniform Resource Locators) and URNs (Uniform Resource Names).

The behavior of the training agent will now be described. After it is started, the agent runs silently as a background process until the user activates it by pressing a predefined hotkey. If the active application is one that the agent recognizes, the agent takes control of the application, as will be described. The agent intercepts commands directed to the host application's user interface, finds tutorial information associated with the intercepted commands, and presents the tutorial information to the user. To signal the change of behavior, the agent changes the shape of the cursor that would otherwise be displayed when the host application is active. The actions of the agent are otherwise transparent to the user.

The user can select an aspect, function or feature of the host application by clicking the mouse on a user interface control. In response to the control selection, the agent performs an action. The relation between controls and actions is stored in the database 34.

In the present implementation, the agent is aware of two types of controls: menu items and windows. A menu item is any entry accessed from the pull-down menu bar of the host application. The menu item may be on one of the main menus or a submenu of the host. The user can select a menu with the mouse using any menu selection procedure. In alternative implementations, the agent is aware of other user interface elements.

The agent can recognize several different types of windows. The user clicks in some part of the host program, and the agent identifies the selected window and performs the associated action. There are a few exceptions: for example, if the user tries to move a window or interact with part of a window's title bar, the agent will return control to the host and allow the window to be moved.

The action can be performed in a variety of ways, such as by starting a presentation program. Typically, the presentation program will display some information pertaining to the selected control. By the selection of an appropriate presentation program, information of any form can be displayed, including text, images, audio, video, or hypertext. Tutorial information for the presentation program can be retrieved from a local fixed disk, from removable media such as CD-ROM or DVD ROM disks, from a server on a local or wide area network or on the Internet. The agent interacts with the Internet by running a Web browser application. Particularly advantageous is training in the form of a mixture of DVD video clips and hypertext documents, with a limited amount of additional material from the Internet to provide up-to-the-minute information.

The agent can use the information in a database file 34 to search for a site, such as an FTP (file transfer protocol) site, with the most current tutorial information and use that information to supplement or replace locally available information. The agent can optionally also use information identifying the program version and host computer configuration to find pertinent current tutorial information. The current information site, or any other source of tutorial information, can be made available to users free, on a pay-as-you-go basis, or on a subscription basis. The database files can optionally include information identifying the sites to which the user has subscribed.

Training for an application can be provided by associating each window and menu item in an application with an action item. For example, the File | Save menu item could then play a video clip describing exactly what the Save menu item does when saving a File. Such associations are stored in files in the agent's database 34. The agent 26 can provide tutorial information for several different applications 32, provided that each application has its own data file.

The agent will not interfere with any running applications. If more than one application is active, the user can invoke one of the applications by clicking with the mouse on part of the application window. The agent then identifies the application and performs the action associated with a command for that application.

Figure 2:
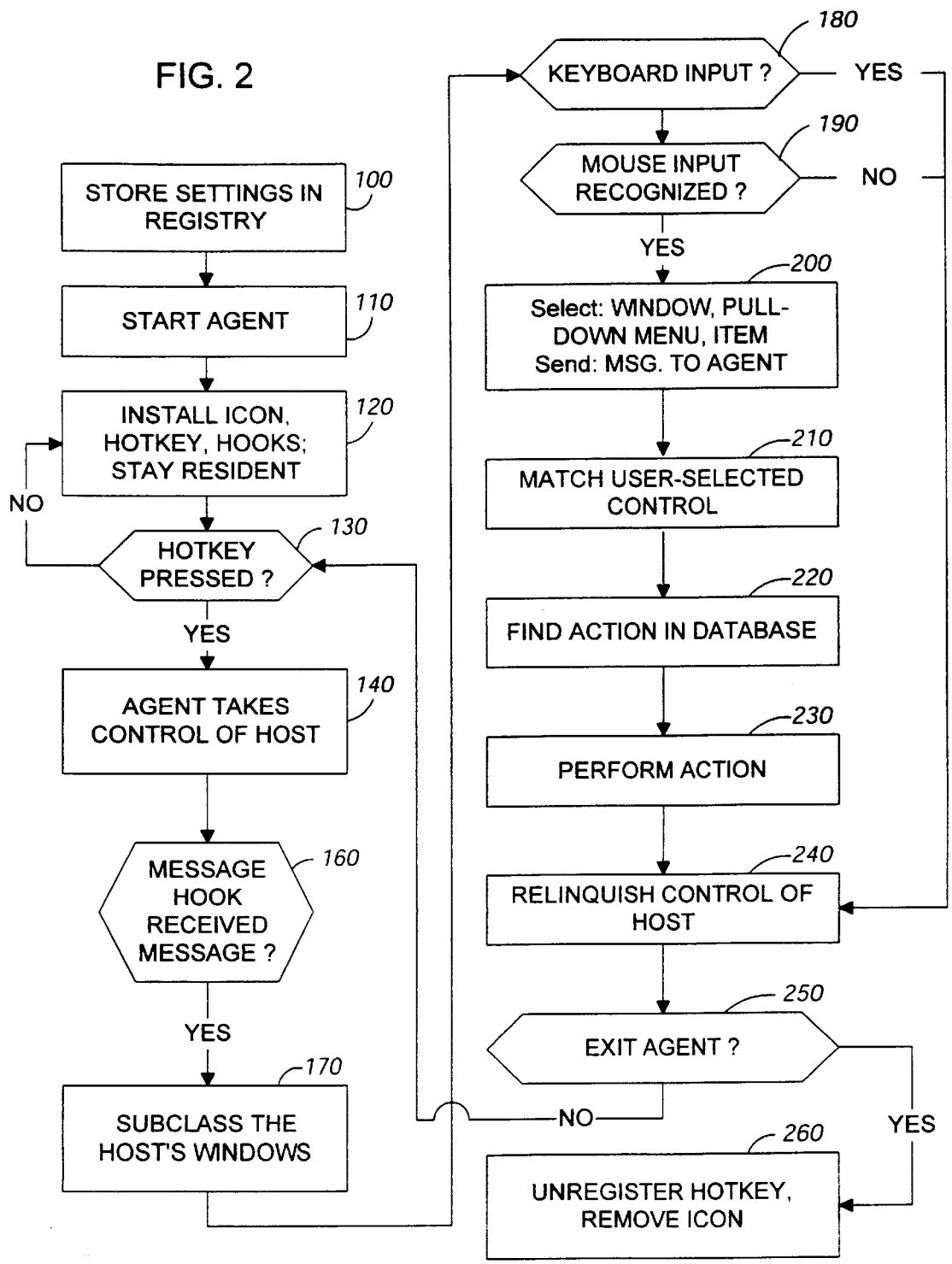
FIG. 2 is a flowchart illustrating the use and behavior of the training agent.

FIG. 2 is a flowchart showing a process of invoking and running the training agent. To the operating system, the agent is a conventional background process until the hotkey is pressed. The agent's settings are stored in the Windows registry 36 (step 100). These settings includes the location of a removable drive, a default hotkey, and the location of a database of data files 34. Each data file defines control/action associations for a specific host program. By specifying several data files in the registry settings, the agent can be activated within several distinct host programs.

When the agent is started (step 110), the agent installs an icon in the Windows system tray to allow the user to set options or exit the agent. It also installs a Windows hotkey using the RegisterHotkey function (step 120). To control the agent's behavior, the user can set options through an icon located in the Windows task bar. For example, the user can specify the hotkey that activates the agent.

Windows will activate the agent when the hotkey is pressed, even if another application is active. The agent runs as a background process until Windows reactivates it with a hotkey message. The presence of the agent does not noticeably degrade system performance. The agent does not monitor any windows or processes, relying instead upon the hotkey mechanism to activate or reactivate it. The agent also occupies a small amount of memory, less than 500 kilobytes.

When the agent's hotkey is pressed, Windows sends a WM_HOTKEY message to the agent's window procedure (step 130). If the agent recognizes the active application, the agent proceeds to take control of the otherwise active application, making it a host application (step 140). The agent detects the active application using the Windows GetForegroundWindow call. When the agent has control of the host, the host receives no mouse or keyboard messages, and will therefore not behave normally. For example, if the File | Save menu item is selected while the agent is in control, the host will not save a file. Instead, the agent will receive the message and look up the File | Save menu item in its database, and will perform some appropriate action, such as displaying a video clip on saving files.

To enable it to take control of the host, the agent installs hooks 24, which are implemented in a Windows .DLL file. A hook procedure is typically used to monitor events and messages sent to another application. However, by using a special technique, a hook or a combination of hooks can be used to take control of the host application.

The agent installs three hooks using the SetWindowsHookEx call. A message hook receives all messages directed at the host program; a mouse hook receives the host program's mouse messages; and a keyboard hook receives the host program's keyboard messages. All of the hook procedures are located in a special hook DLL ("Dynamic Link Library") 24. Because the procedures are in a DLL, the DLL is mapped into the host's address space whenever the hook functions are called.

Windows maintains two separate address spaces for the hook DLL: one in the agent's process and one in the host's process. As a result, there are two independent copies of every global variable. The host's address space is used when a hook procedure is called and remains in use until the hook returns. The agent's address space is used when the agent's executable calls functions in the hook DLL.

Because of this separation of address spaces, interprocess communication is used to communicate information between the hook procedures and the agent. Very little data actually needs to be communicated. Only the identity of the selected window or menu needs to be sent from the hook to the agent, and this is done with a WM_USER message. (A similar message is used if the user cancels the help request.)

When the message hook procedure is first called, it is in the host's address space. On the first call (step 160), the message hook subclasses all windows of the host, using the EnumThreadwindows and EnumChildWindows calls to find the windows (step 170). Thereafter, the message hook remains active until the subclasses are removed, but it does not need to monitor any other messages.

The function of the subclass procedure is to stop messages from reaching the host's windows. Without messages, the host is cut off and the agent has control of the host. In addition, the subclass procedure uses the WM_SETCURSOR message to change the cursor, indicating to the user that the agent has taken control of the host. It watches for WM_EXITMENULOOP messages to signal an aborted attempt to select a menu. It also watches for WM_COMMAND messages, which occur when a menu item is selected.

With the hooks installed by the agent and the agent now in control of the host program, the hooks watch for mouse and keyboard messages.

The keyboard hook watches for keyboard messages (step 180). In one implementation, the key release messages are legal and ignored (the user is probably just releasing the hotkey), and key activation messages other than the hotkey cause the agent to relinquish control of the host program (step 240). In an alternative implementation, the key activation and release messages are processed to determine whether they represent recognized user interface navigation shortcuts: if so, the corresponding control is recognized; if not, the agent relinquishes control of the host program The mouse hook watches several different mouse messages (step 190). Any button messages outside of the expected places (such as outside the client area or in the title bar) cause the agent to relinquish control of the host program (step 240).

Windows provides a hit-test code to the mouse hook procedure. This code is used to interpret WM_BUTTONDOWN and WM_LEFTBUTTONDOWN messages. If the mouse is located inside a menu, the button down message is passed to the subclass procedure to pull down the menu. All subsequent WM_LBUTTONUP/DOWN messages are passed through to the host program. If the mouse is in an unknown area, such as the title bar or outside the host program's client area, the agent relinquishes control of the host program (step 240), as described above. Otherwise, button down messages are ignored. In an alternative implementation, all mouse button down messages are used to identify a window, including title bar clicks.

A WM_LBUTTONUP message selects the window under the mouse. When a window is selected, the mouse hook procedure determines which window was selected using the Windows WindowFromPoint and ChildWindowFromPoint calls. The mouse hook procedure then relinquishes control of the host program and sends a WM_USER message to the agent with the handle of the selected window.

The subclass procedure described above watches WM_COMMAND messages, which are sent when a menu item is selected. When a WM_COMMAND message is received, the subclass procedure relinquishes control of the host program and sends a WM_USER message to the agent with the identifier of the selected menu item (step 200).

Having received information describing the selected control, the agent identifies, in the agent's data file for the host application, a control that is equivalent to the selected control (step 210). The agent attempts to distinguish controls based on their function, not their state. For example, the title of a host main window may include the title of the application, which describes the function of the window, and the name of a document, which is part of the state of the window. State information is unimportant in most applications.

Menu items are easily identified. Each menu item is assigned a numerical identifier by the host program. In almost all cases, these identifiers are unique within a program. Occasionally, an identifier is reused for two menu items with different descriptions but with the same function. For example, the first entry in Microsoft Word's Edit menu is Undo and always has the same identifier. The action to be performed, however, could be Undo Typing, Undo Style, and so on. The function performed, however, is always the same: undo. For that reason, the Undo function is always associated with the same menu identifier, regardless of state.

In comparing a selected window with a window in the agent's host data file, the agent considers two windows identical if (i) they have the same class name; (ii) they share the same parent, or both have no parent; (iii) they share the same owner, or both have no owner; and, optionally, (iv) they have the same text.

A window's class can be determined using the GetClassName call. In most cases, a window's class determines the behavior of the window, and is therefore sufficient to identify the function of the window. There are, however, exceptions. For example, all instances of a standard Windows control share the same class name. Thus, all buttons in Windows 95 use the standard class BUTTON, regardless of their purpose. The window's text can be used to distinguish between standard Windows controls, . For example, two buttons labeled "Add" and "Edit" may have the same class, BUTTON, but their text can be used to identify them as different controls. This approach also has its limitations. A single application could have several different "Add" buttons in different parts of the program, each with a different function. To distinguish between these controls, the agent relies on parent/child and owner relationships. One "Add" button may belong to a Project dialog box while the other belongs to an Editor dialog box: the different parent windows can be used to distinguish them.

In many cases, the text property should not be used to identify a window. In many applications, the text of a window reflects both its function and its state, such as the name of the file being edited. To accommodate this, the agent's data file specifies which windows are identified using their text property. By default, only the following classes of windows use the text property: dialog boxes (class #32770), buttons (class BUTTON), static text fields (class STATIC), and icon titles (class #32772).

The agent stores the association between controls and actions in a simple linked list structure with each element of the list containing the control and the associated action. Finding the action associated with a control is straightforward: the agent searches the list until a control is found that matches the selected control (step 220).

Once the action has been found, it must be performed (step 230). The agent supports three types of actions: commands, documents and URLs. Each behaves differently.

A command action uses a single string containing a command line. The agent uses the CreateProcess call to start the command. Because it uses command line strings, the functionality of the agent easily can be expanded to support new types of actions.

A document action uses a single string containing the filename of the document to open. When the action is performed, the agent uses the ShellExecute call to start a program which can open the document. For example, the Microsoft Notepad program could be started to open a document called readme.txt.

A URL action interprets a URL string in a similar manner, using standard Windows associations to open the program responsible for a given URL. Depending on the user's configuration, this program might be Netscape Navigator or Microsoft Internet Explorer, for example.

Both commands and documents can be stored on any storage medium, such as a fixed or removable disk. Removable disks, such as CD-ROMs or DVD-ROMs, are identified by the label stored in the disk's file system. If a removable disk is not present when an action is performed, the agent prompts the user to insert the disk.

After an action is performed or when the agent aborts an action, the agent relinquishes control of the host program (step 240). All subclassed windows are unsubclassed and returned to their original state, and then all hooks are removed. This order of events is important: if hooks were removed first, the host's windows cannot be unsubclassed. In addition, if a menu is open, the menu is closed before control is relinquished.

The subclasses can only be removed by code in the host's address space. If control needs to be relinquished while executing code in the agent's address space, then the hook code is asked to unsubclass by the subclass procedure itself: a WM_USER message is sent to the subclass procedure, which responds by removing all subclasses.

To remove the hooks, a WM_USER message is also posted to the agent's window after the subclasses have been removed. The agent responds to this message by removing the hooks, restoring the system to its original state.

After the agent relinquishes control of the host, the agent remains active in the background and can be activated again simply by pressing the hotkey. The host resumes receiving and processing its incoming messages and continues to run normally. If the user now exits the agent ("yes" branch of decision step 250), the agent unregisters its hotkey and removes its icon from the system tray (step 260). Otherwise, the agent continues to run as a background process and can be activated by pressing the hotkey (step 130). The agent cannot exit while controlling the host.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks.

The invention has been described in terms of particular embodiments. Other embodiments are within the scope of the following claims. For example, the order of performing steps of the invention can be changed by those skilled in the art and the steps can still achieve desirable results.

What is claimed is:

1. A system for providing information to a user of a computer program application, comprising:

a training agent for finding and displaying tutorial information to a user of a computer program application, the training agent including no portion of the computer program application;

a database providing a computer-readable description of an application user interface and sources of computer-readable tutorial information, the database providing linking information associating elements of the application user interface with sources of computer-readable tutorial information; and means for activating the training agent, the training agent when activated operating to redirect user actions for selecting commands to invoke functions of the computer program application from the application user interface, so that the functions normally performed by the application in response to the actions are not performed, to a presentation program, the presentation program operating to obtain data from the database and to present tutorial information to the user in response to the user actions according to the computer-readable description of the application user interface and linking information associating each user-selected command to a source of computer-readable tutorial information.

2. The system of claim 1, wherein the tutorial information comprises a video clip.

3. The system of claim 2, wherein the video clip includes sound.

4. The system of claim 1, wherein the training agent runs transparently as a background process without affecting the running of the application until activated.

5. The system of claim 1, wherein the training agent runs transparently as a background process without affecting the behavior of the application until activated.

6. The system of claim 1, wherein the training agent is operable to provide training for multiple applications simultaneously.

7. The system of claim 1, wherein the training agent is operable to access an Internet site for a source of computer-readable tutorial information.

8. A method of adding help functionality to a computer program application having a user interface without modifying the computer program application, comprising:

providing a training agent to run on a computer with the computer program application, the training agent being operable to redirect user actions for selecting commands to invoke functions of the computer program application from the user interface, so that the functions normally performed by the application in response to the actions are not performed;

providing a database describing the user interface of the application and defining help actions, the training agent being operable to perform the help actions in response to the user actions for selecting commands to invoke functions of the computer program application redirected by the training agent; and providing tutorial information to be presented to the user by the training agent performing the help actions.

9. The method of claim 8, wherein said training agent can be activated for more than one computer program application.

10. The method of claim 8, wherein said activation command is generated by pressing a predetermined hotkey.

11. The method of claim 8, wherein said tutorial information comprises video, audio or text information.

12. The method of claim 8, further comprising:

installing hooks operable to take control of a computer program application in response to input commands including mouse commands, keyboard commands or messages.

13. A method for providing tutorial information to a user of a computer program application having an application user interface, comprising the steps of:

providing a database comprising a computer-readable description of the application user interface and sources of computer-readable tutorial information, the database providing linking information between the application user interface and the tutorial information;

providing a training agent operable to use the database to find the tutorial information relating to the computer program application based on user input received from the application user interface; and activating the training agent in response to a user-selected activation command wherein the training agent when activated, redirects user actions for selecting commands to invoke functions of the computer program application from the application user interface, so that the functions normally performed by the application in response to the actions are not performed and the tutorial information is invoked instead via the application user interface for presentation to the user.

14. A computer program product stored on a tangible medium for adding tutorial help functionality to a computer program application, said computer product comprising:

a training agent comprising instructions operable on a computer to find tutorial information relating to a computer program application based on user actions for selecting commands to invoke functions of the computer program application redirected from a user interface of the computer program application, so that the functions normaly performd by the application in response to the actions are not performed and the tutorial information is presented instead to a user.

15. The product of claim 14, further comprising:

a database comprising a computer-readable description of the user interface of the computer program application and sources of computer-readable tutorial information, the database providing linking information between the application user interface and the tutorial information.

16. The product of claim 14, further comprising:

the tutorial information.

17. A method for providing tutorial information on demand to a user of a computer program application having an application user interface, the method comprising:

receiving a hotkey input from a user running the computer program application on a computer, and thereupon providing tutorial information to the user in response to user actions for selecting commands to invoke functions of the computer program application redirected from the application user interface, so that the functions normally performed by the application in response to the actions are not performed and the tutorial information is displayed instead.

* * * * *